United States Patent
Hasegawa et al.

(10) Patent No.: US 8,255,204 B2
(45) Date of Patent: Aug. 28, 2012

(54) CHARACTER INPUT APPARATUS, CHARACTER INPUT ASSIST METHOD, AND CHARACTER INPUT ASSIST PROGRAM

(75) Inventors: Takashi Hasegawa, Kanagawa (JP); Michihito Nakagawa, Kanagawa (JP)

(73) Assignee: Sony Mobile Communications Japan, Inc., Tokyo (JP)

( * ) Notice: Subject to any disclaimer, the term of this patent is extended or adjusted under 35 U.S.C. 154(b) by 786 days.

(21) Appl. No.: 12/391,465

(22) Filed: Feb. 24, 2009

(65) Prior Publication Data
US 2009/0234632 A1 Sep. 17, 2009

(30) Foreign Application Priority Data

Mar. 14, 2008 (JP) .................................. 2008-066580

(51) Int. Cl.
G06F 17/20 (2006.01)
(52) U.S. Cl. ..................................... 704/1; 704/6; 704/9
(58) Field of Classification Search ................ 704/1–10, 704/257, 251–255, 276, 270, 272; 715/267
See application file for complete search history.

(56) References Cited

U.S. PATENT DOCUMENTS
6,922,809 B2 * 7/2005 Coden et al. ................... 715/267

FOREIGN PATENT DOCUMENTS
JP 2003-216604 7/2003
* cited by examiner

Primary Examiner — Huyen X. Vo
(74) Attorney, Agent, or Firm — Oblon, Spivak, McClelland, Maier & Neustadt, L.L.P.

(57) ABSTRACT

Disclosed herein is a character input apparatus including: a display section having a screen capable of displaying at least characters; an operation section configured to allow a user to input at least the characters; a first character input processing section configured to perform a first character input process of causing a character string to be displayed on the screen in accordance with a predetermined notation rule; a second character input processing section configured to perform a second character input process of causing a character string to be displayed on the screen not in accordance with the predetermined notation rule; a scene determination section configured to determine a character input scene; and an input process switch control section configured to switch between the first character input process and the second character input process in accordance with the character input scene.

15 Claims, 13 Drawing Sheets

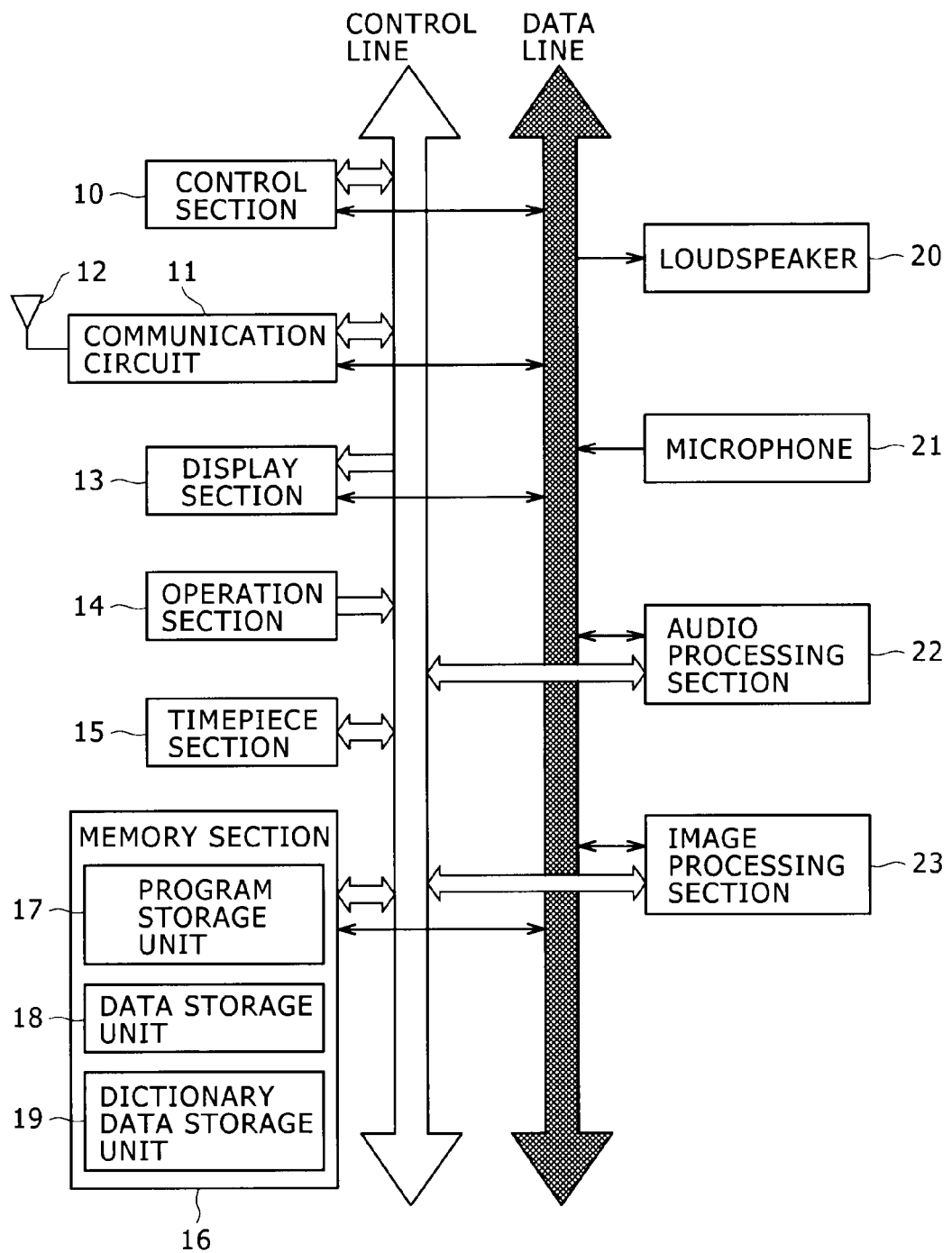

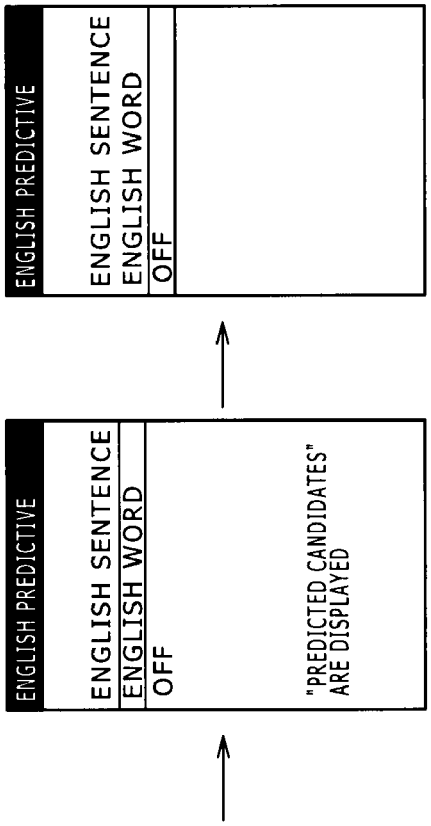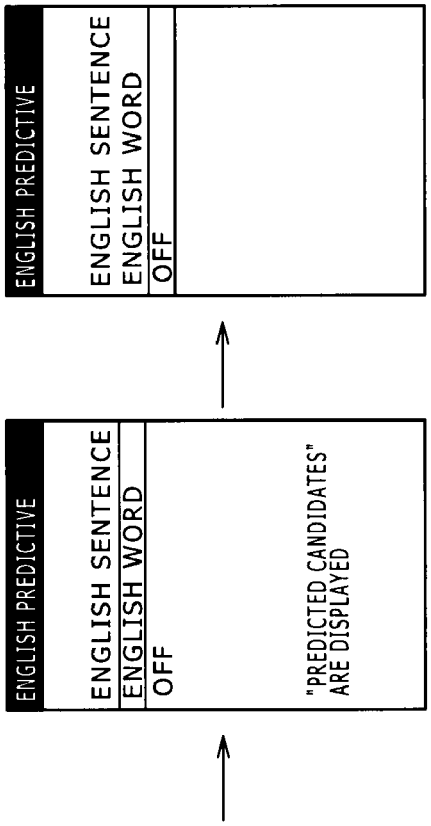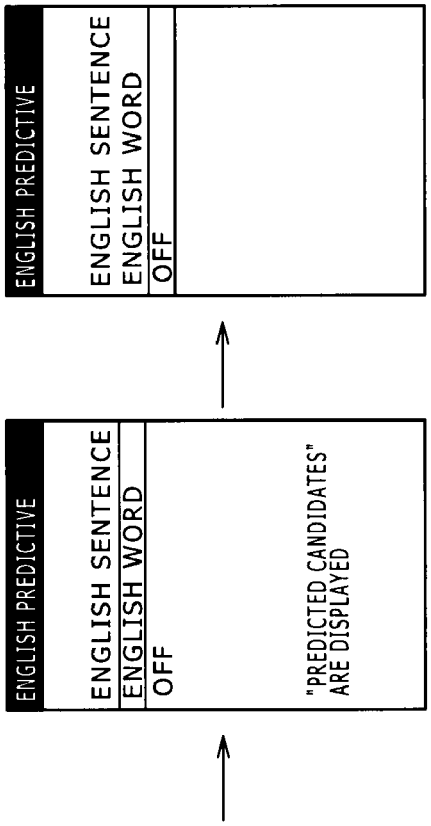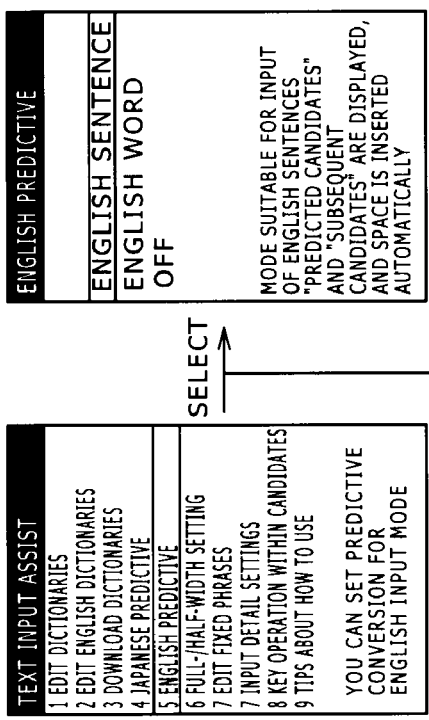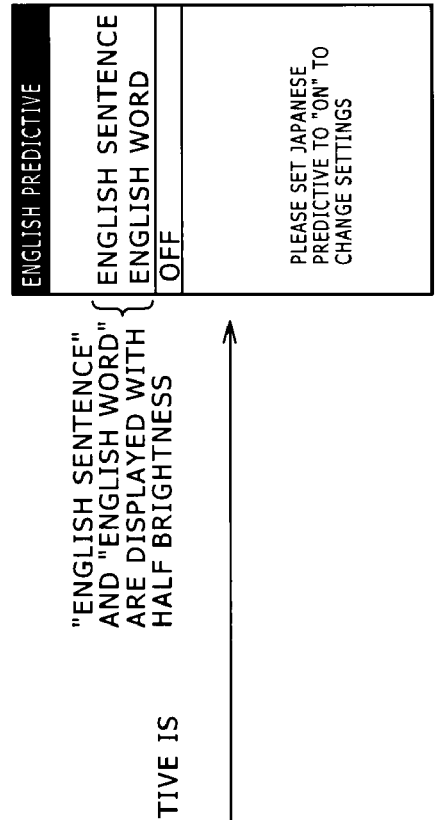

FIG.5A xx INPUT    XX:XX
These flowers have
a nice scent. ☐

XXXXX  KAN KA|aA|12
         CHAR
OPTIONS| ENTER▶  /SYM
         CANDIDATE

FIG.5B

CHARACTER INPUT    XX:XX
These flowers have
a nice scent. A

PREDICTED|EN/NUM/KA|EMO/SYM
A.  Address  About
All  And  Are  A.m.
Also  Any  After  Asp
Access  Action  Add
American  Another
←TAB  ◁NO CONVERSION▷  TAB→
        ▼CANDIDATE

FIG.5C

CHARACTER INPUT    XX:XX
These flowers have
a nice scent. B

PREDICTED|EN/NUM/KA|EMO/SYM
But  Business  Back
Been  Best  Based
Because  Before
Being  Between  Bin
Board  Book  Both
←TAB  ◁NO CONVERSION▷  TAB→
        ▼CANDIDATE

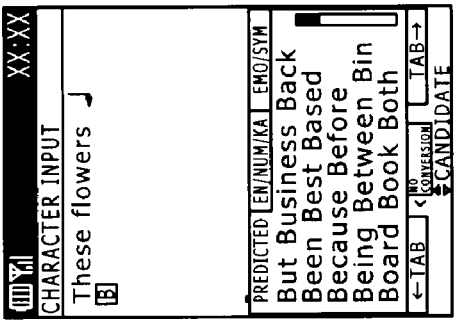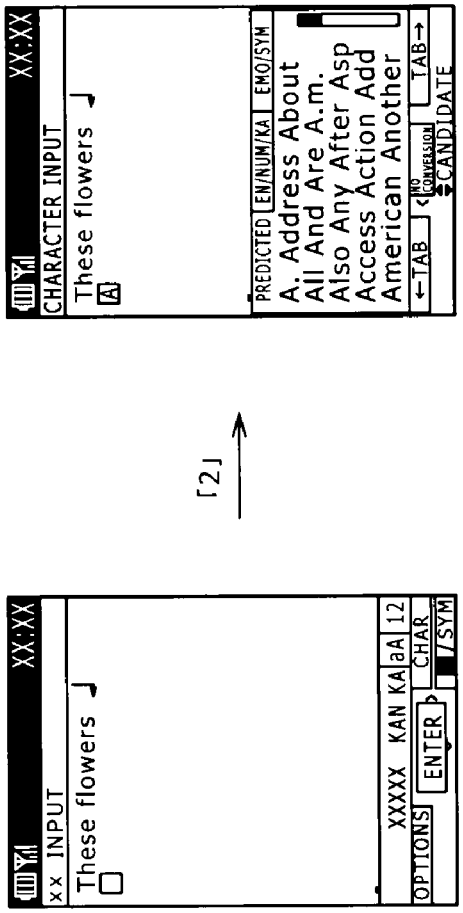

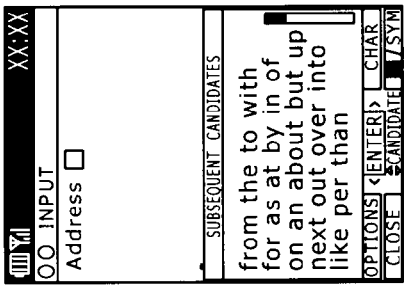
FIG.8C
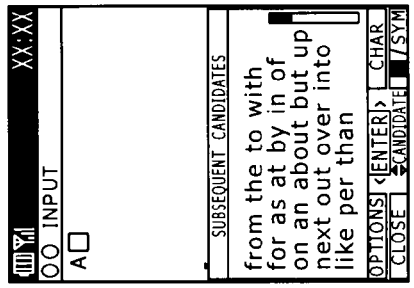
FIG.8D
SELECT "Address"
SOFT KEY 2
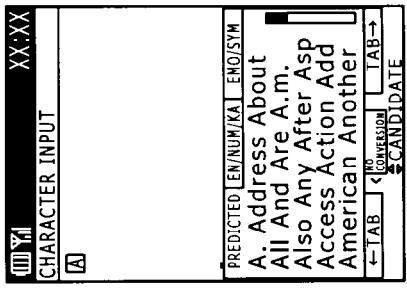
FIG.8B
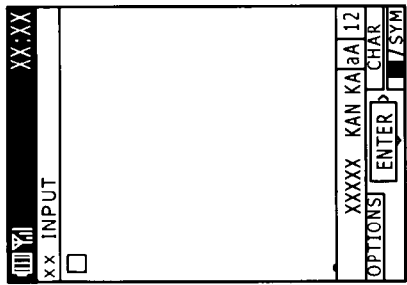
FIG.8A

CHARACTER INPUT APPARATUS, CHARACTER INPUT ASSIST METHOD, AND CHARACTER INPUT ASSIST PROGRAM

CROSS REFERENCES TO RELATED APPLICATIONS

The present invention contains subject matter related to Japanese Patent Application JP 2008-066580, filed in the Japanese Patent Office on Mar. 14, 2008, the entire contents of which being incorporated herein by reference.

BACKGROUND OF THE INVENTION

1. Field of the Invention

The present invention relates to a character input apparatus, a character input assist method, and a character input assist program which can be suitably used when inputting characters on a portable terminal, such as a cellular phone terminal, which can be provided with only a limited number of keys, for example.

2. Description of the Related Art

Portable terminals, such as cellular phone terminals, generally cannot have a large space for operation devices for a user interface. In recent years, it is essential for even the portable terminals, as well as common personal computers, to have a character input and editing function, a function of accessing the Internet to display a web page, and the like.

In the case of the cellular phone terminals, which are examples of the portable terminals, a so-called numeric keypad (which is composed of numeric keys for "0" to "9") and symbol keys for "#" and "*" are used as operation devices for character input and editing, and an arrow key (i.e., a so-called cross key) used to specify directions, such as "→" (Right), "←" (Left), "↓" (Down) and "↑" (Up), or the like is used as an operation device for cursor movement and screen scroll. The ten keys that constitute the numeric keypad and the two symbol keys are sometimes referred to collectively as "twelve keys."

Many recent cellular phone terminals have a so-called predictive conversion function as a function for assisting a user in the character input. The predictive conversion function can have a variety of modes. Generally speaking, the predictive conversion function predicts (infers) a character, word, or the like that the user is now attempting to input, based on a character, word, clause, or the like that is now being inputted or which has already been inputted; displays, on a screen, a list of candidate characters, candidate words, candidate clauses, or the like (hereinafter referred to collectively as "predicted candidates") obtained as a result of the prediction; and, when the user has selected and determined his or her desired one of the predicted candidates in the list of the predicted candidates, determines the selected predicted candidate as an input character, an input word, or an input clause.

For example, Japanese Patent Laid-open No. 2003-216606 (Japanese Patent Laid-open No. 2003-216604 (FIG. 1)) discloses an input character information conversion apparatus and a monitor apparatus. In this related-art technique, a plurality of predicted candidates based on character information inputted by a user using keys or the like are displayed on a screen of the monitor apparatus to present the predicted candidates to the user, and, when the user has selected his or her desired predicted candidate from among the displayed predicted candidates, the selected predicted candidate is entered (so-called predictive conversion).

According to this related-art technique, the plurality of predicted candidates based on input character information are presented to the user as predicted candidates selectable by the user, and the user is able to input a character(s) simply by selecting his or her desired predicted candidate from among the plurality of predicted candidates presented.

SUMMARY OF THE INVENTION

As described above, the predictive conversion function is a very effective function as a function for assisting the user in the character input, but as the number of cellular phone terminals and the like that have the predictive conversion function increases, there has been recently a desire for a character input assist function that is capable of further reducing labor required for the character input.

The present invention addresses the above-identified, and other problems associated with existing methods and apparatuses, and seeks to provide a character input apparatus, a character input assist method, and a character input assist program which are capable of achieving a further reduction in labor required when the user inputs characters.

According to one embodiment of the present invention, there is provided a character input apparatus including: a display section having a screen capable of displaying at least characters; an operation section configured to allow a user to input at least the characters; a first character input processing section configured to perform a first character input process of causing a character string to be displayed on the screen in accordance with a predetermined notation rule when at least displaying a text in a predetermined language; a second character input processing section configured to perform a second character input process of causing a character string to be displayed on the screen not in accordance with the predetermined notation rule; a scene determination section configured to determine a character input scene, the character input scene referring to a situation in which the characters are inputted; and an input process switch control section configured to switch between the first character input process performed by the first character input processing section and the second character input process performed by the second character input processing section in accordance with the character input scene determined by the scene determination section.

According to another embodiment of the present invention, there is provided a character input assist method including the steps of: a first character input processing section performing a first character input process of causing a character string to be displayed on a screen in accordance with a predetermined notation rule when at least displaying a text in a predetermined language on the screen; a second character input processing section performing a second character input process of causing a character string to be displayed on the screen not in accordance with the predetermined notation rule; a scene determination section determining a character input scene, the character input scene referring to a situation in which a character is inputted; and an input process switch control section switching between the first character input process performed by the first character input processing section and the second character input process performed by the second character input processing section in accordance with the character input scene determined by the scene determination section.

According to yet another embodiment of the present invention, there is provided a character input assist program for causing a computer to function as: a first character input processing section configured to perform a first character input process of causing a character string to be displayed on a screen in accordance with a predetermined notation rule when at least displaying a text in a predetermined language; a second character input processing section configured to perform a second character input process of causing a character string to be displayed on the screen not in accordance with the predetermined notation rule; a scene determination section configured to determine a character input scene, the character input scene referring to a situation in which a character is inputted; and an input process switch control section configured to switch between the first character input process performed by the first character input processing section and the second character input process performed by the second character input processing section in accordance with the character input scene determined by the scene determination section.

That is, according to the present invention, the first character input process of causing a character string to be displayed on a screen in accordance with a predetermined notation rule and the second character input process of causing a character string to be displayed on the screen not in accordance with the predetermined notation rule are switched therebetween in accordance with the character input scene, which refers to a situation in which a character is inputted.

According to the present invention, a character input process of causing a character string to be displayed on a screen in accordance with a predetermined notation rule and a character input process of causing a character string to be displayed on the screen not in accordance with the predetermined notation rule are switched therebetween in accordance with the character input scene, which refers to a situation in which a character is inputted, whereby labor required when a user inputs characters can be reduced.

BRIEF DESCRIPTION OF THE DRAWINGS

FIG. 1 is a block diagram illustrating a schematic internal structure of a cellular phone terminal according to an embodiment of the present invention;

FIGS. 3A to 3E illustrates exemplary user interface screens displayed when the input mode is set, specifically, exemplary input mode setting screens displayed when input of English characters is carried out;

FIGS. 5A to 5C illustrate exemplary manners in which input characters are displayed cyclically when a certain key is pressed repeatedly in the English sentence mode, in a situation where a space has been inserted after input of a period;

FIGS. 6A to 6C illustrate exemplary manners in which input characters are displayed cyclically when a certain key is pressed repeatedly in the English sentence mode, immediately after insertion of a line feed;

FIGS. 8A to 8D illustrate exemplary screens displayed when a space is automatically inserted in the English sentence mode;

DETAILED DESCRIPTION OF THE PREFERRED EMBODIMENTS

Figure 2A:
FIGS. 2A to 2C illustrate exemplary user interface screens displayed when an input mode is set, specifically, exemplary input mode setting screens displayed when input of Japanese characters is carried out.

Hereinafter, a character input apparatus, a character input assist method, and a character input assist program according to an embodiment of the present invention will be described with reference to the accompanying drawings.

This embodiment of the present invention adopts a cellular phone terminal that can be provided with only a limited number of keys, as an exemplary device to which a character input apparatus, a character input assist method, and a character input assist program according to an embodiment of the present invention are applied. It will be appreciated that this embodiment is simply an example, and that the present invention is not limited to this embodiment.

[Schematic Internal Structure of Cellular Phone Terminal]

FIG. 1 illustrates a schematic internal structure of the cellular phone terminal according to an embodiment of the present invention.

In FIG. 1, a communication antenna 12 is, for example, a built-in antenna, and transmits and receives signal radio waves for a telephone conversation or packet-switched data transmission. A communication circuit 11 performs frequency conversion, modulation, demodulation, and so on in connection with signals to be transmitted or received. In the case where data received by the communication antenna 12 and the communication circuit 11 is audio data of the telephone conversation, the audio data of the telephone conversation is sent to an audio processing section 22 via a data line. In the case where the data received by the communication antenna 12 and the communication circuit 11 is other types of data, the data received is once sent to a control section 10, which is formed by a CPU, and processed therein, and thereafter is sent from the control section 10 to various parts as necessary.

When the received audio data of the telephone conversation has been supplied from the communication antenna 12 and the communication circuit 11 to the audio processing section 22, the audio processing section 22 decodes the received audio data of the telephone conversation, and sends the resulting telephone conversation audio data to a loudspeaker 20 via the data line.

The loudspeaker 20 includes a loudspeaker for receiving a telephone call and a loudspeaker designed for a ringer (a ringer tone), music play, and alarm sound output, which are provided on the cellular phone terminal. The loudspeaker 20 includes a digital to analog converter and an amplifier. The loudspeaker 20 subjects the audio data of the telephone conversation, data of the ringer tone, or data of a played tune to digital to analog conversion and amplification, and thereafter outputs the resulting data.

A microphone 21 is a microphone for a telephone transmission, and includes an analog to digital converter and an amplifier. A telephone conversation audio signal inputted via the microphone 21 is amplified by the amplifier to a predetermined level, then converted by the analog to digital converter into digital audio data, and then sent to the audio processing section 22 via the data line. The digital audio data is encoded by the audio processing section 22, thereafter sent to the communication circuit 11 via the data line, then subjected to various processes therein such as the modulation and the frequency conversion, and then transmitted via the communication antenna 12.

A display section 13 includes a display provided on a housing of the cellular phone terminal according to this embodiment, such as a liquid crystal display or an organic electroluminescent (EL) display, and a display driving circuit for driving the display. The display driving circuit drives the display based on an image signal supplied from an image processing section 23. As a result, an image, a character, a menu item, or the like is displayed on the display. In the present embodiment, characters that can be displayed on the display include common characters, such as letters in the alphabet, kana characters, kanji characters, and numerals, and various symbols, such as "!," "○," ".," "''," ",," "*," "+," "?," "%," and "#."

The image processing section 23 processes the image displayed on the display section 13. In addition, under control of the control section 10, the image processing section 23 takes charge of displaying of various user interface screens, displaying of a web page, and so on.

An operation section 14 includes: operation devices provided on the housing of the cellular phone terminal according to the present embodiment; and a circuit section for generating an operation signal corresponding to an operation of pressing each key in those operation devices. The operation devices include: twelve keys composed of a numeric keypad, i.e., key buttons "0" to "9," and symbol keys of "#" and "*," which are used for inputting a telephone number, characters, or the like, for example; a so-called cross key composed of directional keys, such as "→ (Right)," "← (Left)," "↓ (Down)," and "↑ (Up)," which is used for cursor movement, focus movement on a menu, and the like; a call key; a clear key; and a ring-off/power key. Illustration of the keys and the like is omitted. The user operates the keys in the operation section 14 to input an instruction to initiate or accept a call for the telephone conversation, to input a character at the time of creating a body of an electronic mail or the like, to input an electronic mail address, to input a uniform resource locator (URL) at the time of viewing a Web page, to input various types of IDs or passwords, or to input an instruction for the cursor movement, menu selection, or the like on the screen, for example. In the present embodiment, a plurality of characters are assigned to each key in the numeric keypad and each of the symbol keys. When each key is pressed repeatedly, the characters assigned to that key become selectable from one to another cyclically. This cyclical switch in a displayed character is sometimes referred to as "toggle display."

A timepiece section 15 generates information about a date and time or the like, and measures the time, and sends the time information to the control section 10 as necessary.

A memory section 16 includes a read-only memory (ROM) and a random access memory (RAM). The ROM stores: an operating system (OS); a control program used for the control section 10 to control various parts; various types of initial setting values; dictionary data used for fonts, kana-kanji conversion, and predictive conversion; sound data for the ringer tone, a key operation sound, and so on; a character input assist program, which is used to perform a character input assist process as described below according to the present embodiment; programs for various types of applications installed on the cellular phone terminal; device identification information (ID) of the cellular phone terminal; and so on. This ROM includes a rewritable ROM, such as a Not AND (NAND)-type flash memory or an electrically erasable programmable read-only memory (EEPROM), and is also capable of storing: electronic mail data; data of a telephone directory and an electronic mail address book; data of a schedule book; various types of data such as a communication history; user dictionary data; still image and video data; the sound data such as the key operation sound; various types of user setting values; and so on. The dictionary data used for the fonts, the kana-kanji conversion, and the predictive conversion are stored in a dictionary data storage unit 19. The various types of application programs, including the character input assist program according to the present embodiment, are stored in a program storage unit 17. The sound data, the electronic mail data, the telephone directory and the address book, the data of the schedule book, and so on are stored in a data storage unit 18. The RAM stores data as necessary, as a work area used when the control section 10 performs various types of data processing.

The control section 10 is formed by the CPU, and performs various types of control for the cellular phone terminal, the character input assist process according to the present embodiment as described below, and so on based on the OS and the various types of programs stored in the memory section 16.

In particular, in the present embodiment, as described in detail below, while the character input assist program is executed, the control section 10 is also capable of performing the so-called predictive conversion process and, in addition, performing either a character input assist process that follows a predetermined notation rule for, for example, displaying or printing an arranged set of characters, character strings, and so on in a predetermined language, such as English, or a character input assist process that does not follow the predetermined notation rule while automatically switching between the two character input assist processes as appropriate, for example.

In the present embodiment, the aforementioned predictive conversion process is a process of displaying a list of predicted candidates in accordance with a character, symbol, word, clause, or the like that is now being inputted or which has already been inputted, and, when the user has selected and determined his or her desired predicted candidate from within the list of the predicted candidates, determining the selected and determined predicted candidate to be an input character, input symbol, input word, or input clause.

The aforementioned predetermined notation rule is a rule that is necessary when displaying or printing a written text. In the case where the predetermined language is English, for example, examples of the predetermined notation rule include: converting a top letter of a word at the top of a sentence into a corresponding capital letter; inserting a space between words; putting a space after any of symbols such as "!," "?," ", (comma)," ". (period)," and "|."

Although not shown in FIG. 1, the cellular phone terminal according to the present embodiment of the present invention also includes various other components that are provided in common cellular phone terminals, such as: a camera section for taking a picture; an electronic wallet function section for handling so-called electronic money; a short-range wireless communication section; a global positioning system (GPS) function section; a memory interface section, to which an external memory is connected; a cable connector section, to which an external cable is connected; a light-emitting diode (LED) for key illumination, an incoming call/message light, and so on, and a driving section for the LED; a vibrator and a driving section for the vibrator; a battery for supplying power to various parts; and a power management IC section for controlling the power.

[Outline of Character Input Assist Process According to Present Embodiment]

In the present embodiment, three inputs modes, "English sentence mode," "English word mode," and "OFF mode," are prepared for a time when English characters, using alphabetic characters, are inputted, for example.

In the cellular phone terminal according to the present embodiment, the three input modes, the English sentence mode, the English word mode, and the OFF mode, are switched therebetween as appropriate when English characters, using the alphabetic characters, or the like are inputted.

In the present embodiment, the input of the English characters is possible in a situation where a character type that can be inputted on the cellular phone terminal is set to a character type designed for the input of the English characters, e.g., in a situation where a character type selection tab of "aA" or "A" (a tab for specifying half-width alphanumeric characters) displayed on the screen, where the character input is possible, is selected.

In the present embodiment, in the English sentence mode selected at the time of the input of the English characters, a "predictive conversion function," a "sentence top character conversion function," an "inter-word space insertion function," an "after-specified-symbol space insertion function," and a "subsequent candidate display function (phrase candidate display function)" are enabled.

The predictive conversion function at the time of the English sentence mode refers to a function of: when the user has inputted an English character (alphabetic character), predicting a character, word, clause, or the like that the user is now attempting to input, based on the inputted English character; displaying a list of candidate characters, candidate words, candidate clauses, or the like (i.e., predicted candidates) obtained by the prediction on the screen; and, when the user has selected and determined his or her desired predicted candidate from within the list of the predicted candidates, determining the selected and determined predicted candidate to be the input character, input word, or input clause.

The subsequent candidate display function refers to a function of: when the input of the predicted candidate has been determined via the aforementioned predictive conversion function or when input of a word or the like has been determined independently of the predictive conversion (hereinafter referred to as "no conversion determination"), reading, from a phrase candidate list, predicted candidates that the user is likely (expected) to input next to the determined predicted candidate or the determined word or the like, i.e., phrase candidates that may follow the previous word or the like; and displaying a list of the read predicted candidates on the screen. In the case of the subsequent candidate display function, as well as in the case of the predictive conversion function, if the user selects and determines his or her desired phrase candidate from within the displayed list of the phrase candidates, the input of the selected and determined phrase candidate is determined.

Note that, in the subsequent candidate display function, the phrase candidates in the phrase candidate list are narrowed down to a smaller number of phrase candidates based on the predicted candidate the input of which has already been determined or the word or the like the input of which has already been determined via the no conversion determination. However, the narrowing down is not carried out when the predicted candidates are retrieved from a default phrase candidate list, whereas the narrowing down is carried out when the predicted candidates are retrieved from other phrase candidate lists. In other words, in the present embodiment, the default phrase candidate list, which is prepared beforehand, is updated by learning based on the selection of the phrase candidate and so on, and the narrowing down of the phrase candidates is performed on the phrase candidate list that has been updated by the learning.

The sentence top character conversion function refers to a function of automatically converting a top character of a word that is considered to be at the top of a sentence into a corresponding capital alphabetical character. In addition, when the list of the predicted candidates or the like is displayed by the aforementioned predictive conversion function or the aforementioned subsequent candidate display function, the sentence top character conversion function displays the predicted candidates or the like, which are extracted from a dictionary to be displayed in the list, so as to be in accord with the right upper-case/lower-case notation, by referring to a current situation of a written text that is being inputted at the time.

Specifically, the sentence top character conversion function determines whether the user is now inputting a character at the top of a sentence or whether the user is now inputting a character somewhere else than at the top of a sentence, for example, and displays the predicted candidate such that the top character thereof is in upper case when the user is now inputting a character at the top of a sentence, and displays the predicted candidate in lower case when the user is now inputting a character somewhere else than at the top of a sentence.

In the present embodiment, in the case where the user presses any key in the numeric keypad or any of the symbol keys repeatedly to display characters assigned to that key from one to another cyclically, the sentence top character conversion function displays, in upper case, each of the first characters that are displayed cyclically as a result of the repeated pressing of the key, when no character has been inputted at the moment, such as when the top character in a written text is to be inputted, for example. The sentence top character conversion function also displays, in upper case, each of the first characters that are displayed cyclically, when a space has been inserted via the "after-specified-symbol space insertion function" described below after any of the specified symbols, such as "!," "?," ", (comma)," ". (period)," and "|," was inputted, or immediately after a line feed was inserted. In the other cases, the sentence top character conversion function carries out the cyclical display in a default manner.

The aforementioned inter-word space insertion function refers to a function of, when the input of any predicted candidate has been determined via the aforementioned predictive conversion function, for example, automatically inserting a space (a half-width space) after the end of the predicted candidate inputted. Note that the inter-word space insertion function does not automatically insert a space when the input of a word or the like has been determined via the no conversion determination.

The aforementioned after-specified-symbol space insertion function refers to a function of, when any of the specified symbols, such as "!," "?," ", (comma)," ". (period)," and "|," has been inputted by the user or through the determination of the predicted candidate, automatically inserting a space (a half-width space) after that symbol. Note that the after-specified-symbol space insertion function automatically inserts a space even when the input of any of the specified symbols or the like has been determined via the no conversion determination.

As described above, in the cellular phone terminal according to the present embodiment, at the time of the English sentence mode, the predictive conversion function and the subsequent candidate display function are enabled, and at the same time, the sentence top character conversion function, the inter-word space insertion function, and the after-specified-symbol space insertion function are enabled, and the character input assist process is thus performed in accordance with the notation rule when displaying or printing an English text or the like, e.g., a rule that the top character of a word at the top of a sentence must be written in upper case, that a space must be inserted between words, and that a space must be inserted after any of the symbols such as "!," "?," ", (comma)," ". (period)," and "|." Hereinafter, the character input assist process that is performed in accordance with the predetermined notation rule, as in the above-described English sentence mode, will be referred to as a "rule-based input process."

In the English sentence mode, if the Clear key or a Left key in the cross key is pressed once while subsequent candidates displayed immediately after the automatic insertion of a space as described above are being displayed, the space automatically inserted is deleted, and a cursor is shifted back to the left (to a position immediately after the character). Note, however, that the subsequent candidates continue to be displayed as they are.

On the other hand, in the aforementioned English word mode at the time of the input of the English characters, only the predictive conversion function is enabled, in contrast to in the English sentence mode. That is, in the English word mode, the subsequent candidate display function is disabled.

In the English word mode, the predicted candidates as extracted from the dictionary are displayed as they are. In other words, the situation of a text that is being inputted at the time is not referred to, as in the above-described English sentence mode, in order to display the predicted candidates while capitalizing them. Further, in the English word mode, a space is not automatically inserted even after the input of a word is determined via the no conversion determination or after the input of a word is determined as a result of the selection of a predicted candidate.

In short, in the above-described English sentence mode, the character input is performed as the rule-based input process in accordance with the predetermined notation rule such that the character at the top of each sentence is written in upper case and a space is inserted between words and after each of the specified symbols such as "!," for example, whereas in the English word mode, each alphabetic character is inputted as a symbol, like a numeral or the like, without application of any special rule concerning the proper use of the upper case and the lower case and commonly without the automatic insertion of a space. Hereinafter, the character input assist process that is performed without the application of any special rule, as in the English word mode, will be referred to as a "rule-free input process."

Needless to say, the cellular phone terminal allows not only the input of the alphabetic characters, such as the English characters, but also the input of Japanese characters. For example, suppose that a Japanese character input mode is enabled, while the above-described English sentence mode is selected in English input mode setting. In this case, when a character that cannot be inputted with a character type designed for Japanese "kana/kanji" input is inputted, the English word mode is enabled temporarily.

In the aforementioned OFF mode at the time of the input of the English characters, both the above-described English sentence mode and the above-described English word mode are disabled. Accordingly, in the OFF mode, alphabetic characters or symbols are inputted individually.

In the cellular phone terminal according to the present embodiment, the OFF mode is enabled temporarily in a situation where input of only English upper-case letters or English lower-case letters is possible as far as the input of English letters is concerned, or in a situation where both the character types are specified in combination, as a result of the selection of the character type selection tab of "aA" or "A" as displayed on the screen where the character input is possible.

In the OFF mode, as in the case of the above-described English word mode, the aforementioned rule-free input process is applied.

[UI for Setting Input Mode]

FIGS. 2A to 3E illustrate exemplary user interface screens displayed when setting the input mode. FIGS. 2A to 2C illustrate exemplary input mode setting screens when the input of Japanese characters is carried out. FIGS. 3A to 3E illustrate exemplary input mode setting screens when the input of English characters is carried out. Each of the user interface screens as described below is generated by the control section 10 controlling the image processing section 23 in accordance with information about a user instruction inputted via the operation section 14, and displayed on the display section 13.

The input mode setting screens as illustrated in FIGS. 2A and 3A are displayed, for example, when menu item "Function/Setting" is selected on a main menu displayed on the screen of the cellular phone terminal, then menu item "User assist" is selected on a next menu displayed, and then menu item "Text input assist" is selected on a next menu displayed. Also, when menu item "Customize" is selected on "Function menu" while a text is being inputted, these input mode setting screens may be displayed.

Figure 2B:
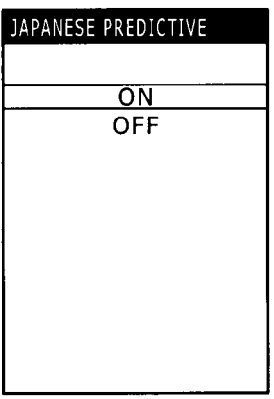
Figure 2C:
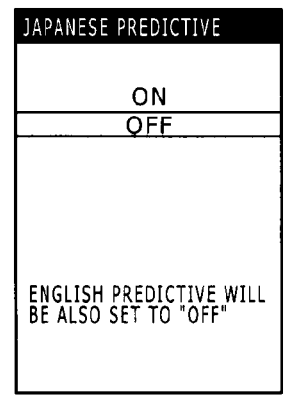

If menu item "4 Japanese predictive" is selected on the input mode setting screen as illustrated in FIG. 2A, for example, the user interface screen transitions to a Japanese predictive ON/OFF selection screen as illustrated in FIGS. 2B and 2C. Then, if menu item "ON" is selected on the user interface screen as illustrated in FIG. 2B, the predictive conversion function for the input of the Japanese characters is set to "Enabled," whereas if menu item "OFF" is selected on the user interface screen as illustrated in FIG. 2C, the predictive conversion function for the input of the Japanese characters is set to "Disabled." In the present embodiment, the setting of "Enabled/Disabled" for the predictive conversion function for the input of the Japanese characters is linked with the setting of "Enabled/Disabled" for the predictive conversion function for the input of the English characters. That is, when the predictive conversion function for the input of the Japanese characters is set to "Enabled," the predictive conversion function for the input of the English characters is also set to "Enabled," whereas when the predictive conversion function for the input of the Japanese characters is set to "Disabled," the predictive conversion function for the input of the English characters is also set to "Disabled."

If menu item "5 English predictive" is selected on the input mode setting screen as illustrated in FIG. 3A, for example, the user interface screen transitions to English predictive mode setting screens as illustrated in FIGS. 3B to 3E. If menu item "English Sentence" is selected on the user interface screen as illustrated in FIG. 3B, the above-described English sentence mode is set to "Enabled." If menu item "English Word" is selected on the user interface screen as illustrated in FIG. 3C, the above-described English word mode is set to "Enabled." If menu item "OFF" is selected on the user interface screen as illustrated in FIGS. 3D and 3E, the above-described OFF mode is set to "Enabled." In the case where the predictive conversion function for the input of the Japanese characters is set to "Disabled," menu items "English Sentence" and "English Word" are displayed with half brightness as illustrated in FIG. 3E, for example, in order to allow the user to recognize that the predictive conversion function for the input of the Japanese characters is set to "Disabled."

[Exemplary Manners in which Input Characters are Displayed Cyclically in English Sentence Mode]

FIGS. 4A to 7C illustrate exemplary manners in which input characters are displayed cyclically as a result of repeated pressing of a key in the English sentence mode. Note that each display presented cyclically as described below is an exemplary screen that is generated by the control section 10 controlling the image processing section 23 in accordance with a pressing signal generated when the user has pressed a certain key on the operation section 14 repeatedly, and then displayed on the display section 13.

Figure 4A:
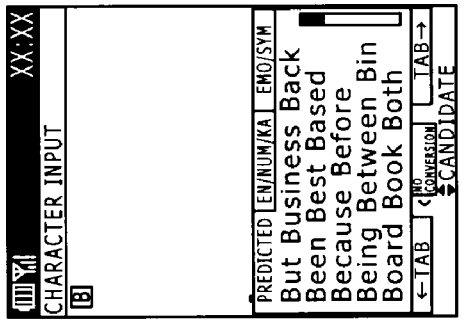
FIGS. 4A to 4C illustrate exemplary manners in which input characters are displayed cyclically when a certain key is pressed repeatedly in an English sentence mode, in a situation where no character has been inputted yet.
Figure 4B:
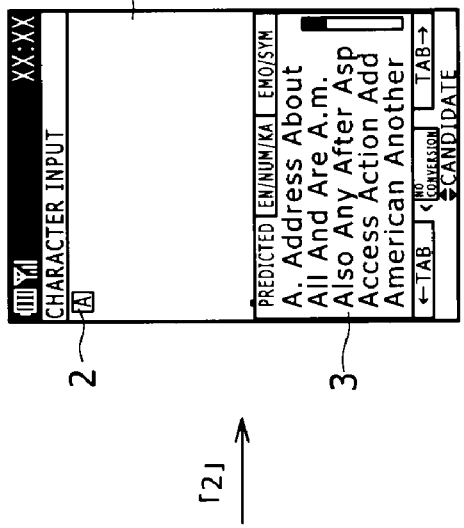
Figure 4C:
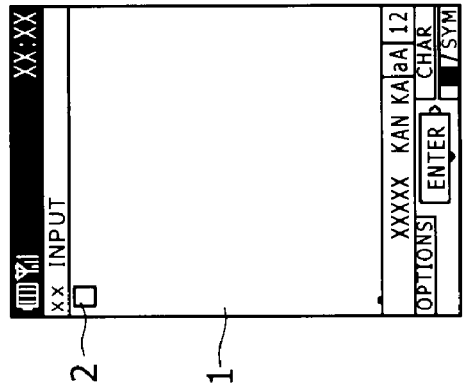

FIGS. 4A to 4C illustrate an exemplary manners in which characters are displayed cyclically when a certain key is pressed repeatedly in a situation where no character has been inputted yet, such as when a top character of writing is to be inputted, for example.

In the case where no character has been inputted yet on a character input screen, a cursor 2 is displayed, for example, at the upper left corner of the screen within a character input area 1 on the screen, as illustrated in FIG. 4A. If the "2" key on the numeric keypad is pressed repeatedly in this situation, for example, characters that are assigned to the "2" key, "a," "b," "c," and so on, are displayed cyclically. Note that, in the situation where no character has been inputted yet, as illustrated in FIG. 4A, the characters that are assigned to the "2" key, "a," "b," "c," and so on, are displayed cyclically in the following order: "A," "B," "C," and so on. That is, if the "2" key is pressed once in the situation as illustrated in FIG. 4A, the capital letter "A" is displayed at the cursor position, as illustrated in FIG. 4B. If the "2" key is pressed once again, the capital letter "B" is displayed at the cursor position, as illustrated in FIG. 4C. Although illustration is omitted, if the "2" key is pressed repeatedly thereafter, characters are displayed at the cursor position cyclically in the following order: "C," "a," "b," "c," "2," "A," and so on.

In the situation where "A" has been inputted (but the input thereof has not been determined yet) as illustrated in FIG. 4B, a plurality of characters, words, and so on that start with the capital letter "A" are displayed as the predicted candidates on a predicted candidate display area 3, which is provided on a lower part of the screen. Similarly, in the situation where "B" has been inputted (but the input thereof has not been determined yet) as illustrated in FIG. 4C, a plurality of characters, words, and so on that start with the capital letter "B" are displayed as the predicted candidates on the predicted candidate display area, which is provided on the lower part of the screen.

Note that in each of the figures described below, the reference numerals will be omitted for the character input area 1, the cursor 2, and the predicted candidate display area 3.

FIGS. 5A to 5C illustrate an exemplary manners in which characters are displayed cyclically when a certain key is pressed repeatedly in the case where a space has been inserted after any of the symbols such as "!," "?," and ". (period)."

Here, FIG. 5A illustrates a situation where a space has been inserted after ". (period)" at the end of a sentence inputted within the character input area. In the case where the "2" key is pressed repeatedly in the situation as illustrated in FIG. 5A, for example, as in the above-described examples of FIGS. 4A to 4C, the characters that are assigned to the "2" key are displayed cyclically in the following order: "A," "B," "C," and so on. That is, if the "2" key is pressed once in the situation as illustrated in FIG. 5A, the capital letter "A" is displayed at the cursor position as illustrated in FIG. 5B. Then, if the "2" key is pressed once again, the capital letter "B" is displayed at the cursor position as illustrated in FIG. 5C. If the "2" key is pressed repeatedly thereafter, characters are displayed at the cursor position cyclically in the following order: "C," "a," "b," "c," "2," "A," and so on.

In the example of FIGS. 5A to 5C, a plurality of characters, words, and so on are displayed as the predicted candidates on the predicted candidate display area 3, which is provided on the lower part of the screen, as in the examples of FIGS. 4A to 4C.

FIGS. 6A to 6C illustrate exemplary manners in which characters are displayed cyclically when a certain key is pressed repeatedly immediately after insertion of a line feed.

Here, FIG. 6A illustrates a situation where, after a certain sentence is inputted within the character input area and a line feed is inserted after the end of the sentence, the cursor has moved to a top of a next "line." If the "2" key is pressed repeatedly in the situation as illustrated in FIG. 6A, for example, as in the above-described examples of FIGS. 4A to 5C, the characters that are assigned to the "2" key are displayed cyclically in the following order, immediately after the line feed: "A," "B," "C," and so on. That is, if the "2" key is pressed once in the situation as illustrated in FIG. 6A, the capital letter "A" is displayed at the cursor position as illustrated in FIG. 6B. Then, if the "2" key is pressed once again, the capital letter "B" is displayed at the cursor position as illustrated in FIG. 6C. If the "2" key is pressed repeatedly thereafter, characters are displayed at the cursor position cyclically in the following order: "C," "a," "b," "c," "2," "A," and so on.

In addition, in the examples of FIGS. 6A to 6C, a plurality of characters, words, and so on are displayed as the predicted candidates on the predicted candidate display area 3, which is provided on the lower part of the screen, as in the examples of FIGS. 4A to 5C.

Figure 7A:
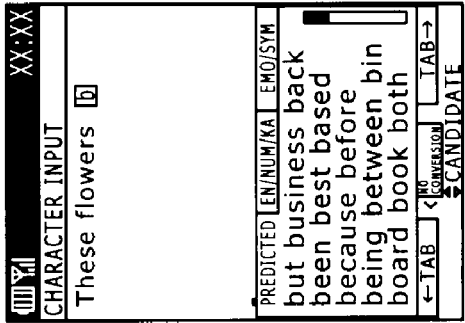
FIGS. 7A to 7C illustrate exemplary manners in which input characters are displayed cyclically when a certain key is pressed repeatedly in the English sentence mode, in another case than the exemplary cases of FIGS. 4A to 6C.
Figure 7B:
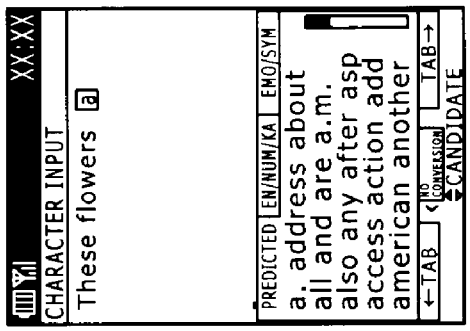
Figure 7C:
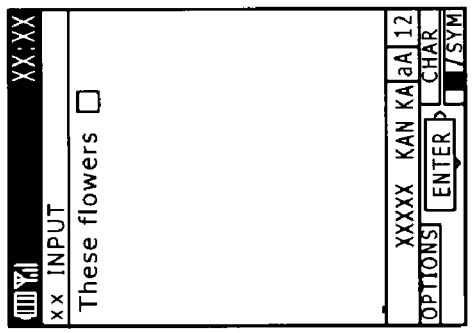

FIGS. 7A to 7C illustrate exemplary manners in which characters are displayed cyclically when a certain key is pressed repeatedly in another case than the above-described exemplary cases of FIGS. 4A to 6C.

Here, FIG. 7A illustrates a situation where, after a certain text is inputted within the character input area, a space (half-width space), for example, has been inputted after the end of that text. If the "2" key, for example, is pressed repeatedly in the situation as illustrated in FIG. 7A, a default cyclical display assigned to the "2" key is carried out. Specifically, if the "2" key is pressed once in the situation as illustrated in FIG. 7A, the lower-case letter "a" is displayed at the cursor position as illustrated in FIG. 7B. Then, if the "2" key is pressed once again, the lower-case letter "b" is displayed at the cursor position as illustrated in FIG. 7C. Then, if the "2" key is pressed repeatedly thereafter, characters are displayed at the cursor position cyclically in the following order: "c," "A," "B," "C," "2," "a," and so on.

In addition, in the case of the examples of FIGS. 7A to 7C, predicted candidates corresponding to the character at the cursor position are displayed in the predicted candidate display area, which is provided on the lower part of the screen.

Specifically, predicted candidates that start with the lower-case letter "a" are displayed in the predicted candidate display area in the case of the example of FIG. 7B, whereas predicted candidates that start with the lower-case letter "b" are displayed in the predicted candidate display area in the case of the example of FIG. 7C.

[Exemplary Displays Presented when Space is Automatically Inserted in English Sentence Mode]

FIGS. 8A to 8D illustrate exemplary screens displayed when a space is automatically inserted in the English sentence mode. Each of the exemplary screens as illustrated in FIGS. 8A to 8D are generated by the control section 10 controlling the image processing section 23 in accordance with the pressing signal generated when the user has pressed a certain key on the operation section 14, and then is displayed on the display section 13.

In the case where no character has been inputted yet on the character input screen, the cursor is displayed, for example, at the upper left corner of the screen within the character input area on the screen, as illustrated in FIG. 8A. If the "2" key on the numeric keypad is pressed repeatedly in this situation, for example, characters are displayed cyclically in the following order, as in the case of the above-described example of FIGS. 4A to 4C: "A," "B," "C," "a," and so on. Then, if word "Address," for example, is selected from within the predicted candidate display area on the screen as illustrated in FIG. 8B and the input of the word "Address" is determined, for example, the sequence of characters, "Address," are displayed in the character input area as illustrated in FIG. 8C. At this time, a space (half-width space) is automatically inserted at a position subsequent to the last character of "Address." Meanwhile, if the input of the character is determined via the no conversion determination, instead of a predicted candidate in the predicted candidate display area being selected, while the screen as illustrated in FIG. 8B is displayed, the automatic insertion of a space is not performed, as illustrated in FIG. 8D. Note, however, that the automatic insertion of a space is performed when the input of any of the specified symbols such as "!," "?," ", (comma)," ". (period)," and "|" has been determined via the no conversion determination, as described above.

In addition, in the case of the examples of FIGS. 8A to 8D, if a predicted candidate is selected from within the predicted candidate display area as illustrated in FIG. 8B, resulting in a transition to the screen as illustrated in FIG. 8C, or if the input of the character is determined via the no conversion determination while the screen as illustrated in FIG. 8B is displayed, the predicted candidate display area is replaced with a display area for the subsequent candidates (i.e., a subsequent candidate display area), and the subsequent candidates as described above are displayed therein.

FIGS. 9A to 9E illustrate exemplary screens displayed when, after a space is automatically inserted in the English sentence mode, the Clear key or the Left key in the cross key is pressed so that the space is deleted. Each of the exemplary screens as illustrated in FIGS. 9A to 9E are generated by the control section 10 controlling the image processing section 23 in accordance with the pressing signal generated when the user has pressed a certain key on the operation section 14, and then is displayed on the display section 13.

Figure 9D:
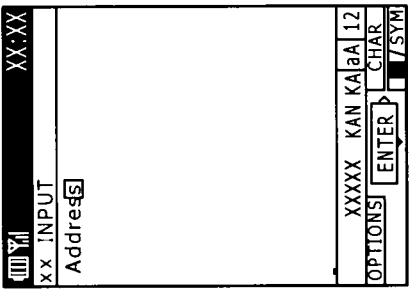
FIGS. 9A to 9E illustrate exemplary screens displayed when, after a space is automatically inserted in the English sentence mode, Clear key or Left key in a cross key is pressed so that the space is deleted.
Figure 9E:
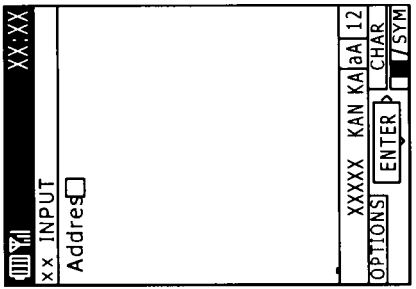
Figure 9B:
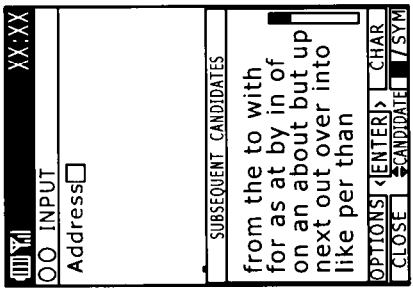
Figure 9C:
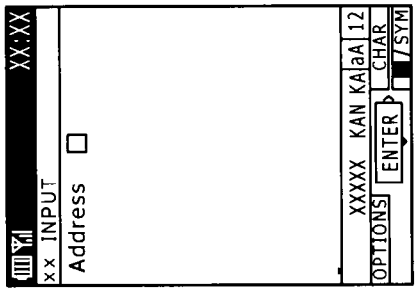
Figure 9A:
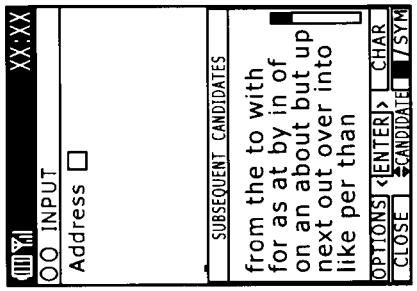

If the Clear key or the Left key, for example, is pressed in the situation where a space (half-width space) has been automatically inserted as a result of selecting and determining the input of the word "Address," for example, as illustrated in FIG. 9A, the space automatically inserted is deleted and the cursor is shifted back by the length of one half-width character, as illustrated in FIG. 9B. Note that, at this time, the subsequent candidate display area continues to be displayed as it is.

Meanwhile, if the Right key in the cross key is pressed in the situation as illustrated in FIG. 9A, for example, the subsequent candidate display area is dismissed, as illustrated in FIG. 9C, for example.

If the Left key is pressed in the situation as illustrated in FIG. 9B, for example, the cursor is accordingly shifted back by the length of one half-width character, as illustrated in FIG. 9D. Even if there is a character at the resulting cursor position at this time, that character is not deleted.

Meanwhile, if the Clear key is pressed in the situation as illustrated in FIG. 9B, for example, the cursor is accordingly shifted back by the length of one half-width character and, at the same time, any character at the resulting cursor position is deleted, as illustrated in FIG. 9E. In the cases of FIGS. 9D and 9E, the subsequent candidate display area is dismissed.

[Function of Automatically Switching Character Input Assist Process]

In relation to the cellular phone terminal according to the present embodiment, there are various possible scenes (i.e., situations in which characters are inputted) where alphabetic characters, such as English characters, are inputted. One example is a scene where alphabetic characters, words, and so on are inputted in accordance with the predetermined notation rule, such as when a text is inputted into a body part of an electronic mail, or when a text is inputted into a note pad. Another example is a scene where alphabetic characters and so on are inputted as symbols not in accordance with the predetermined notation rule, such as when an electronic mail address is inputted, when a URL is inputted, or when a password is inputted.

In the cellular phone terminal according to the present embodiment, it is possible, while the character input assist program is being executed, to automatically and appropriately switch between the aforementioned rule-based input process, i.e., character input assist in accordance with the predetermined notation rule, and the aforementioned rule-free input process, i.e., the character input process that does not follow the predetermined notation rule, depending on the character input scene.

More specifically, in the present embodiment, in the case of character input scenes where processes such as the input of a text into the body part of an electronic mail and the input of a text into the note pad are performed, for example, the character input assist is performed via the rule-based input process, which follows the predetermined notation rule, so as to reduce labor required for the user to accomplish the character input. On the other hand, in the case of character input scenes where processes such as the input of an electronic mail address, the input of a URL, and the input of a password are performed, the character input is performed via the rule-free input process, which does not follow the predetermined notation rule, so as to save the user from the need to perform superfluous operations, such as an operation of switching between the upper case and the lower case, an operation of switching the character type, and an operation of deleting a space, resulting in smoother character input by the user.

[Exemplary Screens Displayed when Rule-Based Input Process and Rule-Free Input Process are Performed]

FIGS. 10A to 12G illustrate exemplary screens displayed when the rule-based input process and the rule-free input process are switched therebetween appropriately.

Figures 10A, 10B, 10C, 10D:
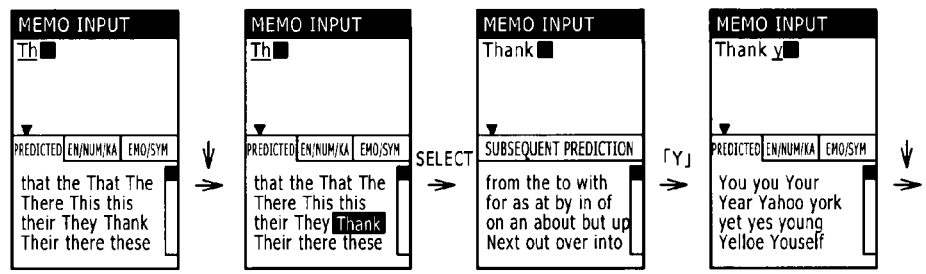
FIGS. 10A to 10N illustrate exemplary screens displayed when English characters are inputted via a rule-based input process in the English sentence mode.
Figures 10E, 10F, 10G, 10H:
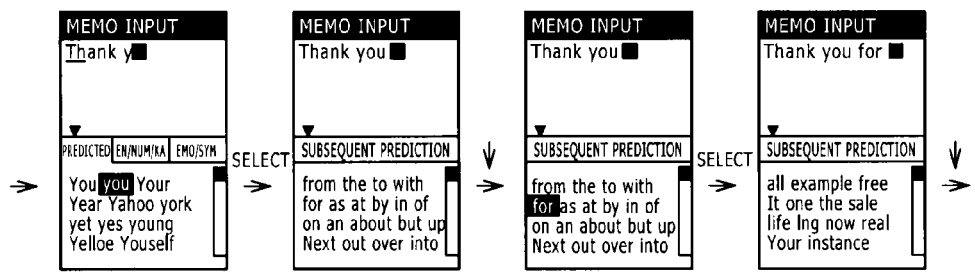
Figures 10I, 10J, 10K, 10L:
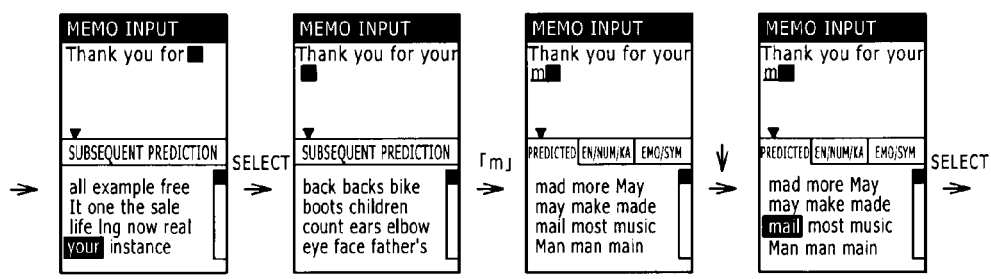
Figures 10M, 10N:
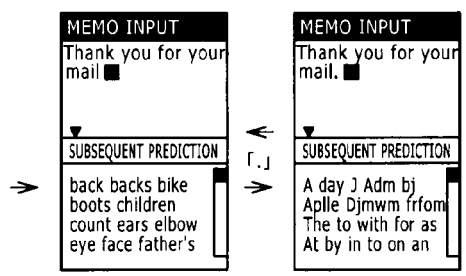

FIGS. 10A to 10N illustrate exemplary screens displayed when English characters are inputted via the rule-based input process in the English sentence mode.

As illustrated in FIG. 10A, if a certain character is inputted in the character input area, the top character is automatically converted into a corresponding capital letter, and a plurality of predicted candidates are displayed in the predicted candidate display area.

Then, if the Down key in the cross key is pressed in this situation, for example, the predicted candidate display area enters an active state, so that the predicted candidates in the predicted candidate display area become selectable, as illustrated in FIG. 10B.

Next, if a desired predicted candidate is selected in the situation as illustrated in FIG. 10B, the character input area enters the active state, the selected predicted candidate is displayed within the character input area, and a space is automatically inserted after the end of the predicted candidate inputted, as illustrated in FIG. 10C. If the Left key is pressed at this time, for example, the space would be deleted and the cursor would be shifted back to the left by the length of one half-width character. In the situation as illustrated in FIG. 10C, the predicted candidate display area has been replaced with the subsequent candidate display area.

Next, if character "y" is inputted in the situation as illustrated in FIG. 10C, for example, the character "y" is displayed in the character input area and, at the same time, the subsequent candidate display area is replaced with the predicted candidate display area, as illustrated in FIG. 10D.

If the Down key is pressed in this situation, for example, the predicted candidate display area enters the active state, so that the predicted candidates in the predicted candidate display area become selectable, as illustrated in FIG. 10E.

Then, if a desired predicted candidate is selected in the situation as illustrated in FIG. 10E, the character input area enters the active state, the selected predicted candidate is displayed within the character input area, a space is automatically inserted after the end of the predicted candidate inputted, and the predicted candidate display area is replaced with the subsequent candidate display area, as illustrated in FIG. 10F.

Next, if the Down key is pressed in the situation as illustrated in FIG. 10F, for example, the subsequent candidate display area enters the active state, so that the subsequent candidates in the subsequent candidate display area become selectable, as illustrated in FIG. 10G.

Then, if a desired subsequent candidate is selected in the situation as illustrated in FIG. 10G, the character input area enters the active state, and the selected subsequent candidate is displayed within the character input area, as illustrated in FIG. 10H.

Next, if the Down key is pressed in the situation as illustrated in FIG. 10H, for example, the subsequent candidate display area enters the active state, so that the subsequent candidates in the subsequent candidate display area become selectable, as illustrated in FIG. 10I.

Then, if a desired subsequent candidate is selected in the situation as illustrated in FIG. 10I, the character input area enters the active state, the selected subsequent candidate is displayed within the character input area, and a space is automatically inserted after the end of the subsequent candidate inputted, as illustrated in FIG. 10J.

Next, if character "m" is inputted in the situation as illustrated in FIG. 10J, the character "m" is inputted in the character input area, and the subsequent candidate display area is replaced with the predicted candidate display area, as illustrated in FIG. 10K.

Then, if the Down key is pressed in this situation, for example, the predicted candidate display area enters the active state, so that the predicted candidates in the predicted candidate display area become selectable, as illustrated in FIG. 10L.

Then, if a desired predicted candidate is selected in the situation as illustrated in FIG. 10L, the character input area enters the active state, the selected predicted candidate is displayed in the character input area, a space is automatically inserted after the end of the predicted candidate inputted, and the predicted candidate display area is replaced with the subsequent candidate display area, as illustrated in FIG. 10M.

Thereafter, if ". (period)" is inputted or the Left key is pressed in the situation as illustrated in FIG. 10M, for example, a space (half-width space) is inserted as illustrated in FIG. 10N.

FIGS. 11A to 11K illustrate exemplary screens displayed when English characters are inputted via the rule-free input process. In FIGS. 11A to 11K, by way of examples, a mail address is inputted, as characters inputted via the rule-free input process, in a character input area designed for an electronic mail address.

In the cellular phone terminal according to the present embodiment, the rule-free input process is automatically enabled when characters are inputted into a mail address input area displayed on the screen at the time of creation of the electronic mail, for example.

Figures 11A, 11B, 11C, 11D:
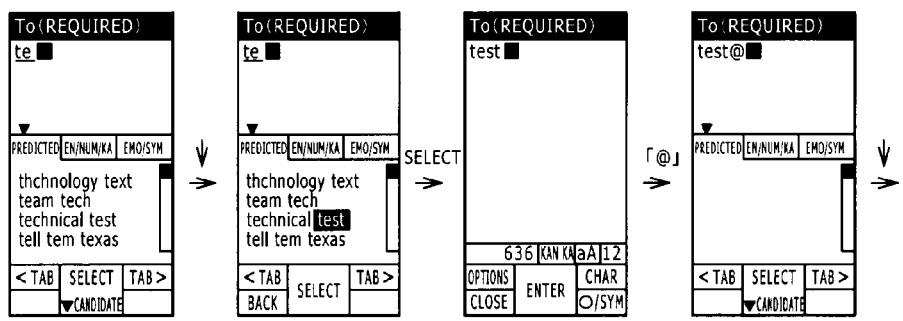
FIGS. 11A to 11K illustrate exemplary screens displayed when English characters are inputted via a rule-free input process.

If a certain character is inputted in the character input area designed for the mail address input, a plurality of predicted candidates are displayed in the predicted candidate display area, as illustrated in FIG. 11A. Then, if the Down key in the cross key is pressed in this situation, for example, the predicted candidate display area enters the active state, so that the predicted candidates in the predicted candidate display area become selectable, as illustrated in FIG. 11B.

Then, if a desired predicted candidate is selected in the situation as illustrated in FIG. 11B, the character input area enters the active state, and the selected predicted candidate is displayed within the character input area designed for the mail address input, as illustrated in FIG. 11C. In the case of FIG. 11C, a space is not automatically inserted within the character input area, no subsequent candidates are displayed, and the character type is set to a character type for English character input, resulting in a state where the character type selection tab of "aA" is selected.

Figures 11E, 11F, 11G, 11H:
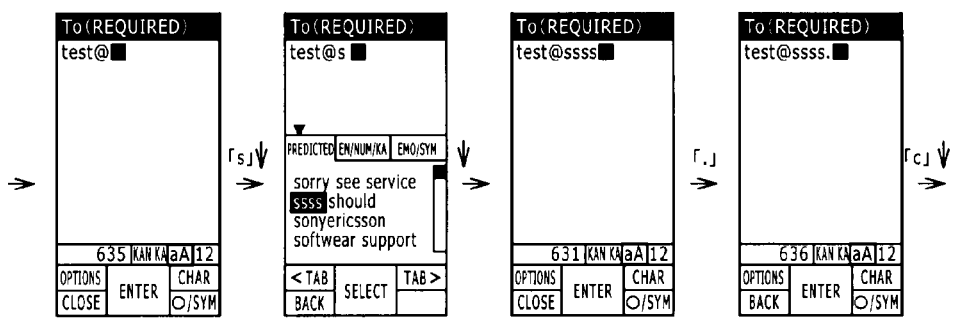

Next, as illustrated in FIG. 11D, character "@" is inputted in the situation as illustrated in FIG. 11C, and the Down key is pressed, for example, to result in a screen as illustrated in FIG. 11E. At this time, since a desired predicted candidate is not present, character "s," for example, is inputted in the situation as illustrated in FIG. 11E, and the Down key is pressed in the situation as illustrated in FIG. 11F. If a desired predicted candidate is selected from within the predicted candidate display area, the selected predicted candidate is inputted so as to follow the aforementioned character "@," as illustrated in FIG. 11G. Note that a space is not automatically inserted in FIG. 11G.

Further, even if ". (period)" is inputted as illustrated in FIG. 11H, for example, a space is not automatically inserted.

Figures 11I, 11J, 11K:
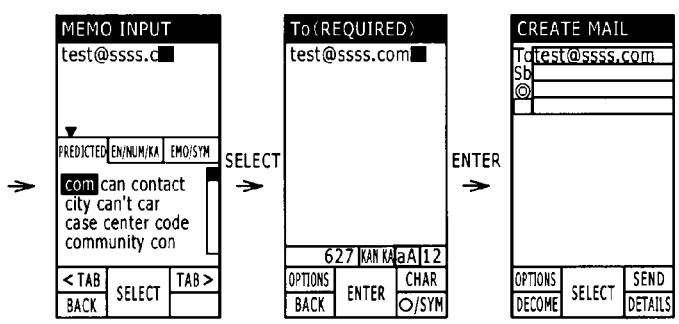

Next, as illustrated in FIG. 11I, character "c" is inputted in the situation as illustrated in FIG. 11H, for example. If the Down key is pressed thereafter, and a desired predicted candidate is selected from within the predicted candidate display area, the selected predicted candidate is inputted so as to follow the aforementioned character ". (period)" as illustrated in FIG. 11J. Note that a space is not automatically inserted in the situation as illustrated in FIG. 11J as well.

If an instruction to determine the input is inputted thereafter, for example, the mail address determined is inputted into a mail address input area, as illustrated in FIG. 11K.

While the exemplary case where the electronic mail address is inputted has been described above with reference to FIGS. 11A to 11K, it will be understood that the rule-free input process is performed in a similar manner even in the case of the character input scenes where a URL, a password, and the like are inputted.

In the above description of the exemplary case of FIGS. 11A to 11K, it has been mentioned that the rule-free input process is automatically started when the character input area designed for the mail address input is used. Note that the rule-free input process is enabled as appropriate even in the case of a character input scene where a mail address or the like is inputted into a character input area designed for the body of the electronic mail or the like, for example.

An exemplary specific character input scene will now be described below where the rule-based input process and the rule-free input process are switched therebetween when characters are inputted into the character input area designed for the body of the electronic mail or the like. Suppose that the character "@" is inputted during the rule-based input process, for example. In this case, if there is a word or the like that was inputted immediately before the character "@," a space that has been inserted between the character "@" and the immediately previous word inputted is automatically deleted, so that the character "@" and the immediately previous word are linked together, and at the same time the rule-free input process is automatically enabled in place of the rule-based input process. Note that, in the case where a top character of the immediately previous word inputted is in upper case, that top character may be converted into a corresponding lower-case letter as necessary. Thereafter, when characters or the like, such as ".jp" or ".com," that are commonly considered to be entered at the end of an electronic mail address have been inputted, it is determined that the input of the electronic mail address has been completed, and the rule-based input process is enabled again in place of the rule-free input process.

As another conceivable example, when characters such as "WWW" or "http://" have been inputted during the rule-based input process, the rule-free input process may be automatically enabled in place of the rule-based input process. In this case, it may be determined, upon input of a line feed, for example, that the input of a URL has been completed, so that the rule-based input process is enabled again in place of the rule-free input process.

There is yet another example conceivable. That is, when an operation of deleting a space automatically inserted has been repeated a specified number of times (e.g., twice, once, etc.) in succession during the rule-based input process, the rule-free input process may be automatically enabled in place of the rule-based input process. In this case, when an operation of inserting a space has been performed thereafter, or the input of ". (period)" or the input of a line feed has been performed thereafter, for example, the rule-based input process may be automatically enabled in place of the rule-free input process.

FIGS. 12A to 12G illustrate exemplary screens displayed in the case where the English word mode is selected temporarily when, in the case where Japanese characters are being inputted in a situation where the English sentence mode is enabled in the English input mode setting, a character that cannot be inputted with the character type designed for Japanese "kana/kanji" input is inputted.

Figures 12A, 12B, 12C, 12D:
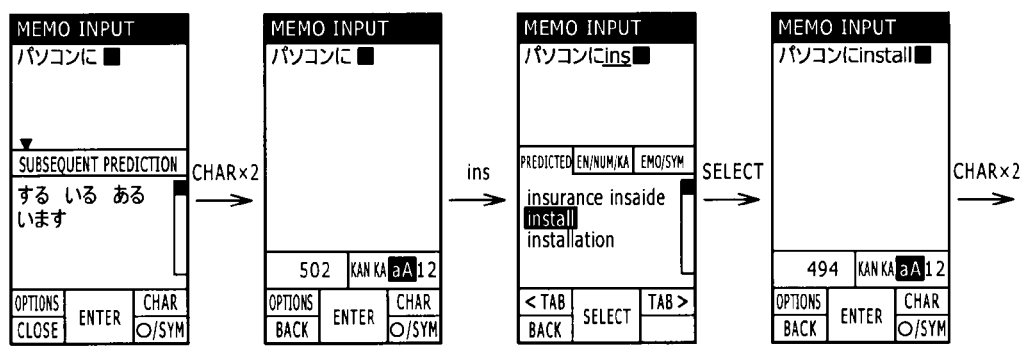
FIGS. 12A to 12G illustrate exemplary screens displayed in the case where an English word mode is enabled temporarily when, in the case where Japanese characters are being inputted in a situation where the English sentence mode is enabled in English input mode setting, a character that cannot be inputted with a character type designed for Japanese "kana/kanji" input is inputted.

Suppose that, when a Japanese text is being inputted as illustrated in FIG. 12A, a key to which a function of specifying a character type is assigned is pressed a certain number of times (twice in this example), for example, so that the character type selection tab of "aA" (i.e., the tab for specifying the half-width alphanumeric characters) is selected as illustrated in FIG. 12B. Then, as illustrated in FIG. 12C, the character input area shifts into a state in which input of half-width English characters is possible at a position following the Japanese characters that have been inputted previously. Then, if English characters are inputted within the character input area, predicted candidates in reference to those English characters are displayed in the predicted candidate display area. Note that a space is not automatically inserted in the situation as illustrated in FIG. 12C.

Next, in the situation as illustrated in FIG. 12C, a desired predicted candidate is selected from within the predicted candidate display area, the selected predicted candidate is inputted within the character input area as illustrated in FIG. 12D, and thereafter the key to which the function of specifying a character type is assigned is pressed a certain number of times (twice in this example), for example, so that a character type selection tab of "Kan" (i.e., a tab for specifying kana/kanji characters) is selected. As a result, as illustrated in FIG. 12E, the character input area shifts back into a state in which the input of Japanese characters is possible.

Figures 12E, 12F, 12G:
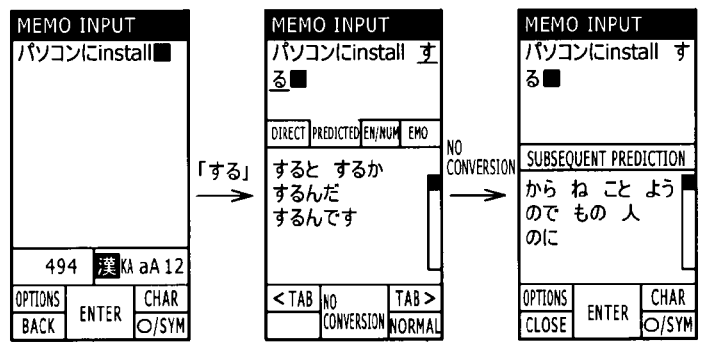

Then, as illustrated in FIG. 12F, if the input of Japanese characters is resumed and a desired predicted candidate is selected from within the predicted candidate display area, the selected predicted candidate is inputted in the character input area, and the predicted candidate display area is replaced with the subsequent candidate display area, as illustrated in FIG. 12G.

Note that in the example of FIGS. 12A to 12G, in the cases where the Japanese input mode is set to the input mode based on the predictive conversion and English characters are inputted at the position following Japanese characters, the predictive conversion is performed even in the input of the English characters. Note, however, that the predictive conversion may not be performed when English characters are inputted at the position following the Japanese characters.

[Flow for Switching Process Mode]

Figure 13:
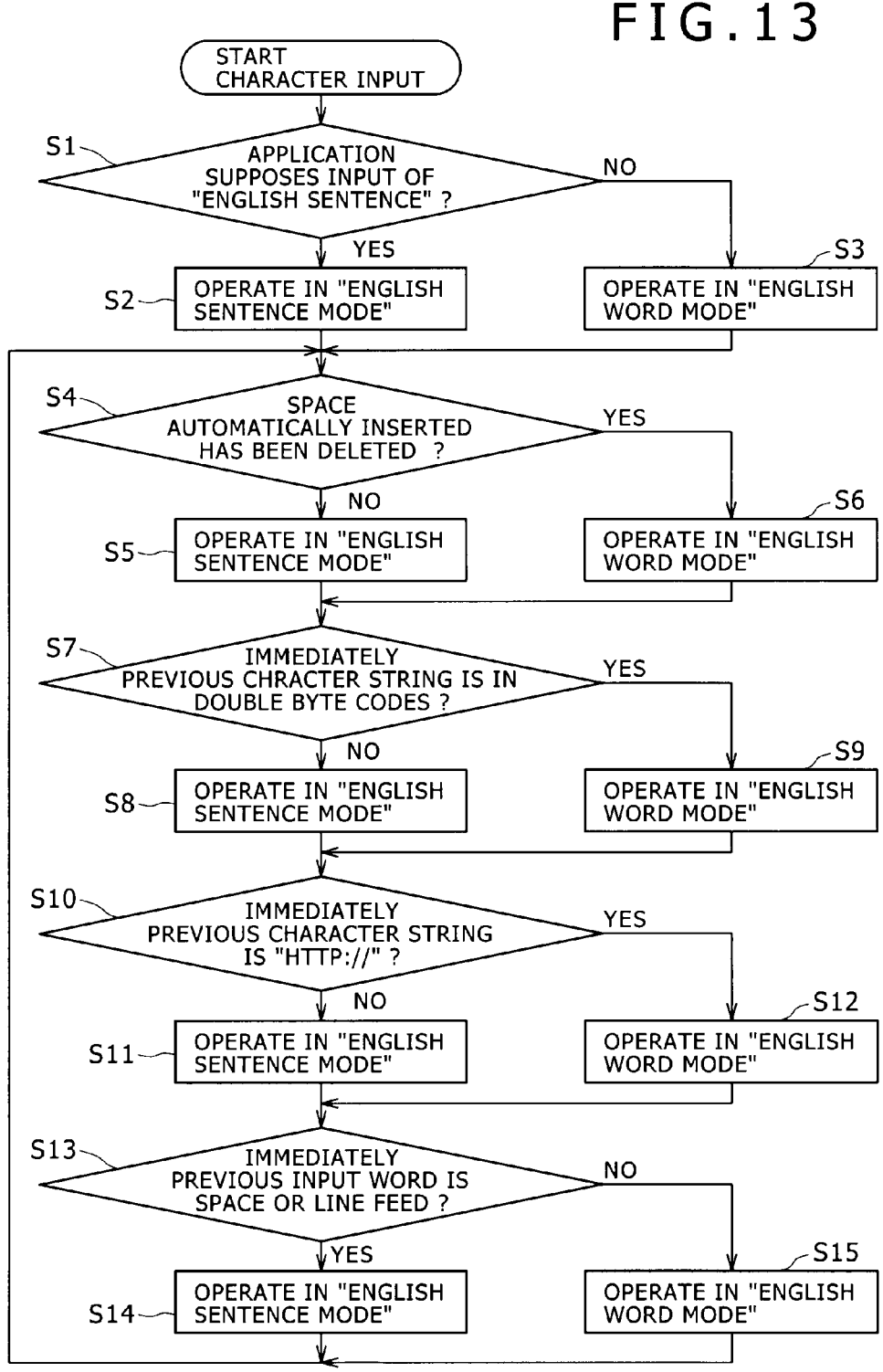
FIG. 13 is a flowchart illustrating a switching process in the case where the English sentence mode and the English word mode are switched therebetween.

FIG. 13 is a flowchart illustrating a process of switching between the rule-based input process and the rule-free input process in accordance with the character input scene in the cellular phone terminal according to the present embodiment, specifically, a process of switching between the English sentence mode and the English word mode. Note that the flowchart as illustrated in FIG. 13 illustrates only that part of the character input assist process, performed by the control section 10 by executing the character input assist program in the memory section 16, which is related to the process of switching the mode, while the other parts of the character input assist process are omitted in the flowchart.

In FIG. 13, after an application that uses the character input assist program is activated, the control section 10 determines at step S1 whether the character input scene that is supposed by the activated application is an input scene of "English Sentence," for example. In the case where the activated application is an electronic mail application, for example, the control section 10 determines whether or not the character input that is supposed by the application at the time is "English Sentence," by determining whether the current character input scene is a scene where characters are inputted into the input area designed for the body of the electronic mail or a scene where characters are inputted into the input area designed for the electronic mail address, for example. Specifically, when the current character input scene is a scene where characters are inputted into the input area designed for the body of the electronic mail, the control section 10 determines that the character input that is supposed by the application at the time is "English Sentence," whereas when the current character input scene is a scene where characters are inputted into the input area designed for the electronic mail address, the control section 10 determines that the character input that is supposed by the application at the time is "English Word."

If the control section 10 determines at step S1 that the character input that is supposed by the application is "English Sentence," the control section 10 performs the character input assist process in the English sentence mode at step S2, and proceeds to step S4. Meanwhile, if the control section 10 determines at step S1 that the character input that is supposed by the application is "English Word," the control section 10 performs the character input assist process in the English word mode at step S3, and proceeds to step S4.

At step S4, the control section 10 determines whether, when a space has been automatically inserted, the operation of deleting that space has been performed.

If the control section 10 determines at step S4 that the space automatically inserted has been deleted, the control section 10 performs the character input assist process in the English word mode at step S6, and proceeds to step S7. Meanwhile, if the control section 10 determines at step S4 that the space automatically inserted has not been deleted, the control section 10 performs the character input assist process in the English sentence mode at step S5, and proceeds to step S7.

At step S7, the control section 10 determines, when an English character is inputted, whether or not an immediately previous character string is a character string in double byte codes, i.e., whether or not the immediately previous character string is a Japanese input character string.

If the control section 10 determines at step S7 that the immediately previous character string is in double byte codes, the control section 10 performs the character input assist process in the English word mode at step S9, and proceeds to step S10. Meanwhile, if the control section 10 determines at step S7 that the immediately previous character string is not in double byte codes, the control section 10 performs the character input assist process in the English sentence mode at step S8, and proceeds to step S10.

At step S10, the control section 10 determines, when an English character is inputted, whether or not the immediately previous character string is "http://," i.e., whether or not the immediately previous character string is a character string that supposes input of a URL.

If the control section 10 determines at step S10 that the immediately previous character string is "http://," the control section 10 performs the character input assist process in the English word mode at step S12, and proceeds to step S13. Meanwhile, if the control section 10 determines at step S10 that the immediately previous character string is not "http://," the content section 10 performs the character input assist process in the English sentence mode at step S11, and proceeds to step S13.

At step S13, the control section 10 determines, when an English character is inputted, whether or not an immediately previous input is an operation of inserting a space or an operation of inputting a line feed.

If the control section 10 determines at step S13 that the immediately previous input is the operation of inserting a space or the operation of inputting a line feed, the control section 10 performs the character input assist process in the English sentence mode at step S14. Meanwhile, if the control section 10 determines at step S13 that the immediately previous input is neither the operation of inserting a space nor the operation of inputting a line feed, the control section 10 performs the character input assist process in the English word mode at step S15.

Thereafter, the control section 10 returns to step S4.

[Summary]

As described above, in the cellular phone terminal according to the present embodiment, the predictive conversion process is performed as a part of the character input assist, and at the same time, the character input assist that follows the predetermined notation rule (i.e., the rule-based input process) and the character input that does not follow the predetermined notation rule (i.e., the rule-free input process) are switched therebetween automatically in accordance with the character input scene, so that the labor required for the user to accomplish the character input is reduced, or smooth character input is accomplished.

Note that the above-described embodiment has been described by way of example. It should be understood by those skilled in the art that the present invention is not limited to the above-described embodiment, and that various modifications, combinations, sub-combinations and alterations may occur depending on design requirements and other factors insofar as they are within the scope of the appended claims or the equivalents thereof.

In the above-described embodiment, English has been cited as an example of the languages that use the alphabetic characters. Note that the present invention is not limited to the alphabetic characters or English, and that the present invention is also applicable to various other cases where a text or characters are inputted in other languages, such as French, German, Russian, Arabic, and Chinese, that have their own notation rules.

Also note that the present invention is not limited to the cellular phone terminal as cited in the above-described embodiment, and that the present invention is also applicable to various other cases where the character input is performed on various portable terminals, such as a personal digital assistant (PDA), a remote controller for a car navigation system, and a remote controller for audio visual equipment.

What is claimed is:

1. A character input apparatus, comprising:
   a display section having a screen capable of displaying characters;
   an operation section configured to allow a user to input the characters;
   a first character input processing section configured to perform a first character input process of causing the characters to be displayed on the screen in accordance with a predetermined notation rule when displaying a text in a predetermined language;
   a second character input processing section configured to perform a second character input process of causing the characters to be displayed on the screen not in accordance with the predetermined notation rule;
   a scene determination section configured to determine a first character input scene and a second character input scene, the first character input scene being a character input area of the display section in which the characters are displayed in accordance with the predetermined notation rule and the second character input scene being a character input area of the display section in which the characters are displayed not in accordance with the predetermined notation rule; and
   an input process switch control section configured to apply the first character input process performed by the first character input processing section when the scene determination section determines the characters are being input in the first character input scene, and to apply the second character input process performed by the second character input processing section when the scene determination section determines the characters are being input in the second character input scene.

2. The character input apparatus according to claim 1, wherein the first character input processing section performs a character input assist process based on predictive conversion.

3. The character input apparatus according to claim 1, wherein the scene determination section determines the first character input scene and second character input scene based on an application program activated for character input.

4. The character input apparatus according to claim 1, wherein the scene determination section determines the first character input scene and second character input scene based on a predetermined character inputted by the user via the operation section.

5. The character input apparatus according to claim 1, wherein the scene determination section determines the first character input scene and second character input scene based on a predetermined operation instruction inputted by the user via the operation section.

6. The character input apparatus according to claim 1, wherein, when the predetermined language or a character type has been replaced with another predetermined language or another character type for character input, the scene determination section determines the first character input scene and second character input scene based on the other predetermined language or the other character type.

7. The character input apparatus according to claim 1, wherein the first character input scene is an email message body character input field.

8. The character input apparatus according to claim 1, wherein the first character input scene is a note pad character input field.

9. The character input apparatus according to claim 1, wherein the second character input scene is a password character input field.

10. The character input apparatus according to claim 1, wherein the second character input scene is an interne URL address character input field.

11. The character input apparatus according to claim 1, wherein the second character input scene is an email address character input field.

12. The character input apparatus according to claim 1, wherein the second character input scene is a login username character input field.

13. A character input assist method, comprising the steps of:
a first character input processing section performing a first character input process of causing a character string to be displayed on a screen in accordance with a predetermined notation rule when displaying a text in a predetermined language on the screen;
a second character input processing section performing a second character input process of causing a character string to be displayed on the screen not in accordance with the predetermined notation rule;
a scene determination section having a processing circuit determining a first character input scene and a second character input scene, the first character input scene being a character input area of the screen in which the character string is displayed in accordance with the predetermined notation rule, and the second character input scene being a character input area of the screen in which the character string is displayed not in accordance with the predetermined notation rule; and
an input process switch control section applying the first character input process performed by the first character input processing section when the scene determination section determines the character string is being input in the first character input scene, and applying the second character input process performed by the second character input processing section when the scene determination section determines the character string is being input in the second character input scene.

14. A non-transitory computer readable medium having instructions stored therein that when executed by a computer cause the computer to function as:
a first character input processing section configured to perform a first character input process of causing a character string to be displayed on a screen in accordance with a predetermined notation rule when displaying a text in a predetermined language;
a second character input processing section configured to perform a second character input process of causing a character string to be displayed on the screen not in accordance with the predetermined notation rule;
a scene determination section configured to determine a first character input scene and a second character input scene, the first character input scene being a character input area of the screen in which the character string is displayed in accordance with the predetermined notation rule, and the second character input scene being a character input area of the screen in which the character string is displayed not in accordance with the predetermined notation rule; and
an input process switch control section configured to apply the first character input process performed by the first character input processing section when the scene determination section determines the character string is being input in the first character input scene, and to apply the second character input process performed by the second character input processing section when the scene determination section determines the character string is being input in the second character input scene.

15. A character input apparatus, comprising:
display means for having a screen capable of displaying characters;
operation means for allowing a user to input the characters;
first character input processing means for performing a first character input process of causing the characters to be displayed on the screen in accordance with a predetermined notation rule when displaying a text in a predetermined language;
second character input processing means for performing a second character input process of causing the characters to be displayed on the screen not in accordance with the predetermined notation rule;
scene determination means for determining a first character input scene and a second character input scene, the first character input scene being a character input area of the screen in which the characters are displayed in accordance with the predetermined notation rule, and the second character input scene being a character input area of the screen in which the characters are displayed not in accordance with the predetermined notation rule; and input process switch control means for applying the first character input process performed by the first character input processing means when the scene determination means determines the characters are being input in the first character input scene, and applying the second character input process performed by the second character input processing means when the scene determination means determines the characters are being input in the second character input scene.

* * * * *